Aug. 12, 1924.

C. A. PARSONS ET AL 1,504,372

GEAR CUTTING MACHINE

Filed June 7, 1923

2 Sheets-Sheet 1

Inventors:
Charles A. Parsons, and
Stanley S. Cook,
by Spear Middleton Donaldson & Hall
Attys.

Patented Aug. 12, 1924.

1,504,372

UNITED STATES PATENT OFFICE.

CHARLES ALGERNON PARSONS AND STANLEY SMITH COOK, OF NEWCASTLE-ON-TYNE, ENGLAND; SAID COOK ASSIGNOR TO SAID PARSONS.

GEAR-CUTTING MACHINE.

Application filed June 7, 1923. Serial No. 644,016.

*To all whom it may concern:*

Be it known that we, CHARLES ALGERNON PARSONS and STANLEY SMITH COOK, both subjects of the King of Great Britain and Ireland, and both residing at Heaton Works, Newcastle-on-Tyne, in the county of Northumberland, England, have invented certain new and useful Improvements in and Relating to Gear-Cutting Machines, of which the following is a specification.

The invention relates to gear-cutting machines of the type in which a creeping motion of the table supporting the work is provided in order to distribute errors due to inaccuracies in the main or other gear wheel of the train driving said table.

In order to explain the object of the present invention, reference is made herewith by way of example to the type of creep gear-cutting machine described in United States specification No. 1,234,379 dated the 24th day of July, 1917, in which the phase-changing gear train is carried by what is therein called the primary table, while the work itself is carried by the secondary table.

In the gear-cutting machine described in that specification it will be seen that in consequence of the continuous variation of the point of engagement in relation to the work and in relation to the cutter the direction of the force which serves to rotate the secondary or work-carrying table continuously changes and since there must be a running clearance between the journal and bearing which centre the work-table, a slight eccentric movement of the latter may take place in such a way that the axis of the table moves round in a small circle and thereby effects the accuracy of the finished wheel.

The object of the present invention is to prevent the occurrence of such a movement and thereby to eliminate a possible source of error in the finished wheel.

With this object, the invention consists in the combinations of elements hereinafter set forth and more particularly pointed out in the claims.

Referring to the accompanying drawings, which illustrate one form of the invention by way of example:—

Figure 1:
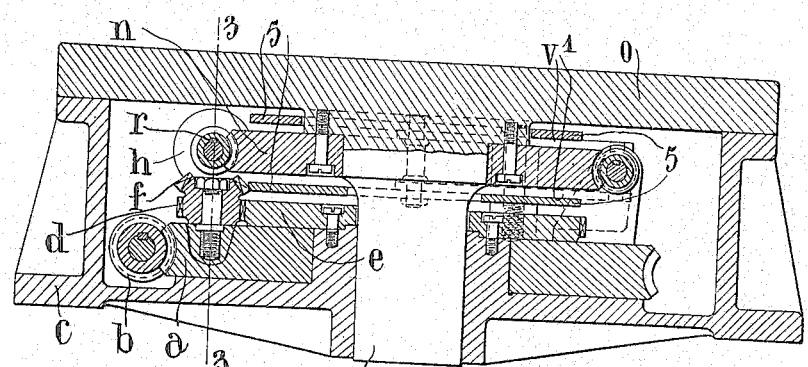
Figure 2:
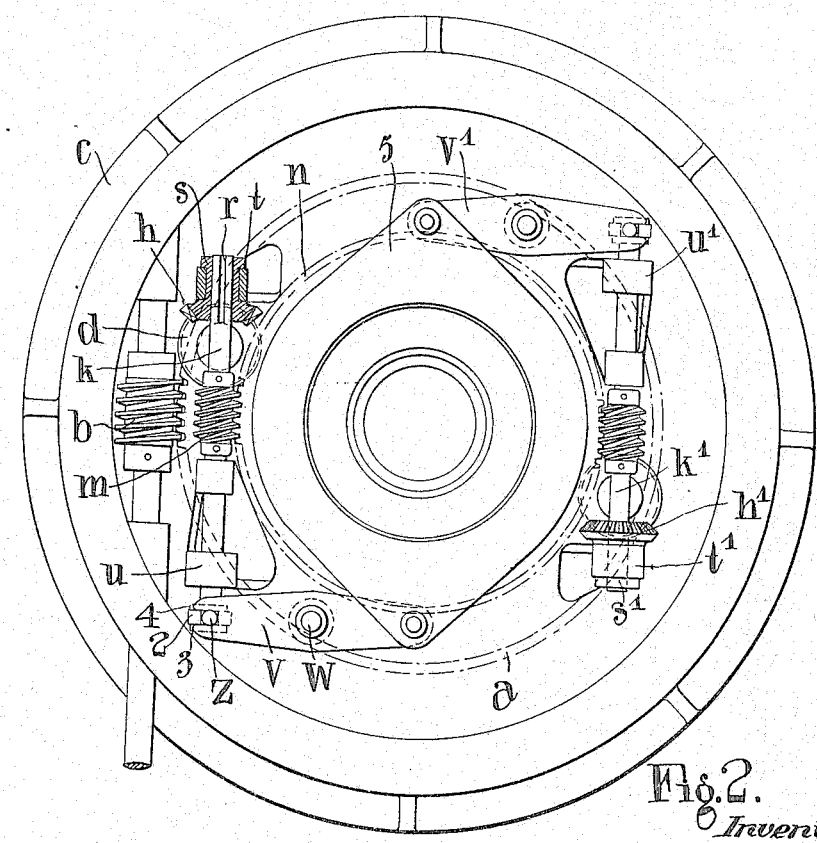

Figure 1 shows a cross-sectional elevation through the creep-producing drive;

Figure 2 being a plan with the work-carrying table removed, and

Figure 3:
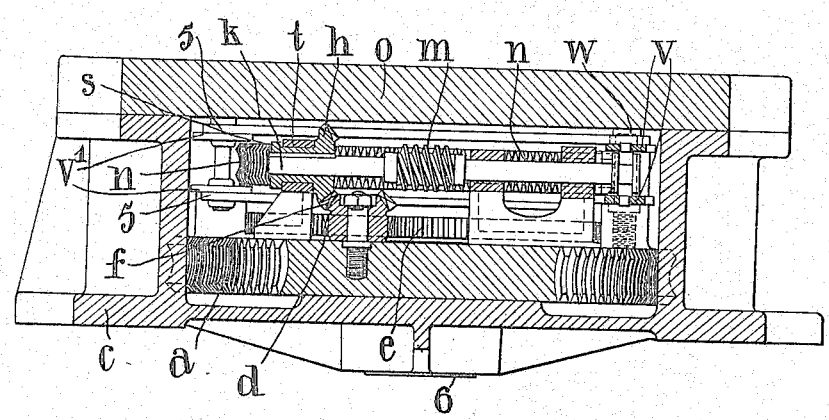

Figure 3 a section on the line 3—3 of Figure 1.

In carrying the invention into effect according to the form shown in the drawings, the gear train may be substantially of the type shown in Figures 1 and 2 of patent specification No. 1,234,379 of 1917. Thus, the primary member, $a$, is formed as a worm-wheel and driven by a worm, $b$, rotatably mounted on the frame, $c$, and itself carries a pinion, $d$, gearing with a stationary spur or helical sun wheel, $e$, and so acting as the planet of a sun and planet gear. The planet is integral with a mitre wheel, $f$, gearing with a companion, $h$, mounted on a spindle, $k$, carrying a worm, $m$, which gears with a worm-wheel, $n$, attached to the secondary member or work-carrying table, $o$.

All the members of the creep-producing train between the stationary sun wheel, $e$, and the worm-wheel, $n$, on the secondary member are mounted on the primary member, $a$, and rotate with it.

According to the present invention, in order to compensate for the unsymmetrical action of the creep-producing gear carried round on the primary member, $a$, a second similar creep-producing gear is introduced at a point diametrically opposite, the elements of this gear being indicated in the drawings by accented reference symbols. The worm spindles, $k$, $k'$, are, however, splined (see $r$, Figures 1 and 2) respectively to their coaxial mitre wheels, $h$, $h'$, the latter being prevented by suitable collars, $s$, $s'$, from axial movement in their bearing brackets, $t$, $t'$, while on the other hand the worm spindles, $k$, $k'$, are capable of moving axially in the second bearing bracket, $u$, $u'$, provided in each case, so that the relative configuration of the spindles, $k$, $k'$, and the sun wheel, $e$, is varied.

In order to ensure an exact balancing of the drive, the two worm spindles, $k$, $k'$, are interconnected by any suitable form of differential or balancing gear.

According to one such form, a lever formed of upper and lower plates, $v$, $v$, is rotatably mounted on the stud or pin, $w$, forming a fulcrum and carried by the primary member, a, the plates, v, v, at one end engaging with a pin, z, forming part of the thrust washer, 2, disposed between the thrust collars, 3, 4, on the worm spindle, k. A second lever, formed of upper and lower plates, v', v', similarly mounted, coacts with the second worm spindle, k', the two levers being interconnected at their other ends, as shown, by a link formed of upper and lower plates, 5, 5, passing round the centre spindle, 6, of the work-table, o.

By means of the interconnection described, the thrusts of the worm spindles, k, and k', are equalized and a "pure couple" drive thereby transmitted to the work-carrying table.

The creep-producing drive is thus transmitted to the work-table, o, in parallel through the two sets of gearing, the interconnecting mechanism serving to correlate the longitudinal positions of the worm spindles, k, k', in their bearings.

The remaining forces acting on the work-carrying table, mainly frictional resistance to rotation, forces produced by the tooth-cutter and the weight of the table itself and its adjuncts, are constant in direction and substantially constant in amount, so that the resultant of all the forces acting on the work-table is itself substantially constant and the centring journal retains a constant position in its retaining bearing during the cutting operation.

It will be seen that instead of the interconnecting links described, any other suitable form of differential or balancing gear may be utilized for the purpose.

In addition, the scope of the invention is broad enough to include any suitable alternative form of the main gear train.

Having now described our invention, what we claim as new and desire to secure by Letters Patent is:—

1. In a gear-cutting machine of the creep type, the combination of a plurality of creep-producing gear trains in parallel, together with means for equalizing the action of said trains, as set forth.

2. In a gear-cutting machine of the creep type, the combination of a plurality of epicyclic creep-producing gear trains, said trains including a common sun, together with means for equalizing the action of said trains, as set forth.

3. In a gear-cutting machine of the creep type, the combination of a primary gear, a secondary or work-carrying gear, a plurality of creep-producing gear trains in parallel between said gears, together with means for equalizing the action of said trains, as set forth.

4. In a gear-cutting machine of the creep type, the combination of a primary gear, a secondary or work-carrying gear, a plurality of creep-producing gear trains mounted on one of said gears and gearing with the other, a third gear co-axial with one of said gears and gearing with said plurality of trains, together with means for equalizing the action of said trains, as set forth.

5. In a gear-cutting machine of the creep type, the combination of a primary gear, a secondary or work-carrying gear, a plurality of creep-producing gear trains mounted on one of said gears and gearing with the other, a third gear co-axial with one of said gears and gearing with said plurality of trains, said third gear and certain corresponding members of said trains being relatively movable to change their configuration, as set forth.

6. In a gear-cutting machine of the creep type, the combination of a primary gear, a secondary or work-carrying gear, a plurality of creep-producing gear trains in parallel between said gears, said trains including gear elements axially movable together with means for correlating the axial positions of said elements, as set forth.

7. In a gear-cutting machine of the creep type, the combination of a primary gear, a secondary or work-carrying gear co-axial therewith, a pair of like creep-producing gear trains in parallel between said gears and arranged diametrically opposite in relation to the common axes of said primary and secondary gears, together with means for equalizing the action of said trains, as set forth.

8. In a gear-cutting machine of the creep type, the combination of a primary gear, a secondary or work-carrying gear, a plurality of creep-producing gear trains mounted on one of said gears and gearing with the other, a third gear co-axial with one of said gears and gearing with said plurality of trains together with means for equalizing the action of said trains, said equalizing means including elements mounted on the same gear as are said trains, as set forth.

9. In a gear-cutting machine of the kind indicated, the combination of a primary gear, a secondary or work-carrying gear, a pair of creep-producing gear trains mounted on said primary gear and gearing with said secondary gear, a third gear co-axial with said primary gear and gearing with said pair of trains, together with means for equalizing the action of said trains, as set forth.

10. In a gear-cutting machine of the kind indicated, the combination of a primary gear, a secondary or work-carrying gear, a pair of creep-producing gear trains mounted on said primary gear and gearing with said secondary gear, a third gear co-axial with said primary gear and gearing with said pair of trains, said third gear and certain corresponding members of said trains being relatively movable to change their configuration, as set forth.

11. In a gear-cutting machine of the kind indicated, the combination of a primary gear, a secondary or work-carrying gear, a pair of creep-producing gear trains mounted on said primary gear and gearing with said secondary gear, a third gear co-axial with said primary gear and gearing with said pair of trains together with means for equalizing the action of said trains, said equalizing means including elements mounted on the primary gear, as set forth.

In testimony whereof we have signed our names to this specification.

CHARLES ALGERNON PARSONS.
STANLEY SMITH COOK.